Jan. 11, 1966   W. E. BROWN ETAL   3,228,797
GASEOUS FUEL CELL AND PROCESS OF GASEOUS FUEL CELL OPERATION
Filed June 16, 1961   2 Sheets-Sheet 1

WILLIAM E. BROWN
CHARLES A. LEVINE
   INVENTORS

BY
   ATTORNEY

WILLIAM E. BROWN
CHARLES A. LEVINE
INVENTORS

United States Patent Office 3,228,797
Patented Jan. 11, 1966

3,228,797
GASEOUS FUEL CELL AND PROCESS OF
GASEOUS FUEL CELL OPERATION
William E. Brown and Charles A. Levine, Concord, Calif.,
assignors to The Dow Chemical Company, Midland,
Mich., a corporation of Delaware
Filed June 16, 1961, Ser. No. 117,715
32 Claims. (Cl. 136—86)

This invention relates to gaseous fuel cells. More particularly, this invention relates to gaseous fuel cells in which the electrolyte is formed from a solid ion exchange resin membrane having no electrolytic material present other than the material of the ion exchange resin.

Gaseous fuel cells have been known in the art for many years. Such cells have certain inherent advantages over other forms of converting chemical energy into electrical energy. Included among these advantages are the high efficiency of energy conversion which in most instances is many percent more than standard fuel procedures, such as the production of heat and mechanical energy in the form of steam or the like.

In recent years there has been intensive activity in the field of research relative to gaseous fuel cells, because they possess a number of attributes which are of inherent desirability in energy systems used in rocketry and in remote geographical installations. Such cells possess no moving parts, have a wide operating range and high shock resistance. They are capable of operating in zero gravity conditions and/or in installations where non-attended operation of the energy system is essential.

A further advantage of gaseous fuel cells is their ability to respond to erratic peak demand. Thus, where the gases used are, for example, hydrogen and oxygen, the electrical energy may be employed in the electrolysis of water to produce additional hydrogen and oxygen at times of no load. During the times that the cell is operating, the hydrogen and oxygen combine to form the water. There is thus produced a reversible energy conversion system which is readily adaptable to erratic peak demand.

The prior art has suggested the use of a solid ion exchange membrane as the electrolyte in gaseous fuel cells. Such membranes may be formed of cation exchange resins or anion exchange resins of various suitable materials, as set forth in detail hereafter. The use of these solid ion exchange membranes as the electrolyte in gaseous fuel cells is particularly advantageous in the environmental conditions discussed above. Since no other electrolyte is present, there is no problem as to storage of electrolytic solution. Additionally, there can be no dilution of the electrolyte since these membrane materials are solid and are insoluble in water and in both polar and nonpolar organic solvents. This insolubility is the result of the cross-linked character of the synthetic polymeric material employed in the membrane structure.

Thus, fuel cells constructed with ion exchange resin membranes as the sole electrolyte therein are odorless, silent, noncorrosive, and are further characterized by their ability to function at ambient temperatures and pressures.

The major inherent disadvantage possessed by gaseous fuel cells of the prior art has been the low energy density of the cells, i.e., the low power available per unit volume of fuel cell.

It is, accordingly, an object of the present invention to produce a fuel cell having an energy density many multiples higher than the density achievable by any of the devices of the prior art. More particularly, it is an object of the present invention to provide a fuel cell and a process of fuel cell operation which incorporates a plurality of fine, continuously hollow fibers formed from or comprising ion exchange materials and having a catalytic electrode material coated on the exterior surface of the hollow fibers and a catalytic electrode material coated on the interior walls of the fibers, these coatings being electrically discontinuous from each other.

Further objects and advantages of this invention will become apparent from the following description, and the features of novelty which characterize this invention will be pointed out with particularity in the claims appended to and forming a part of this specification.

An even more complete understanding of the nature and objects of the invention is afforded by reference to the accompanying drawings, taken in connection with the following description, wherein:

FIGURE 3 is a greatly enlarged partial axial cross-sectional view of the individual hollow fiber, coated fuel cell elements;

FIGURE 4 is a greatly enlarged longitudinal cross-sectional view of the end portion of one of the hollow fibers of the invention having an interior electrode coating;

FIGURE 5 is an axial cross-sectional view of hollow fiber elements having additional electrically conductive coatings thereon.

Figure 1:
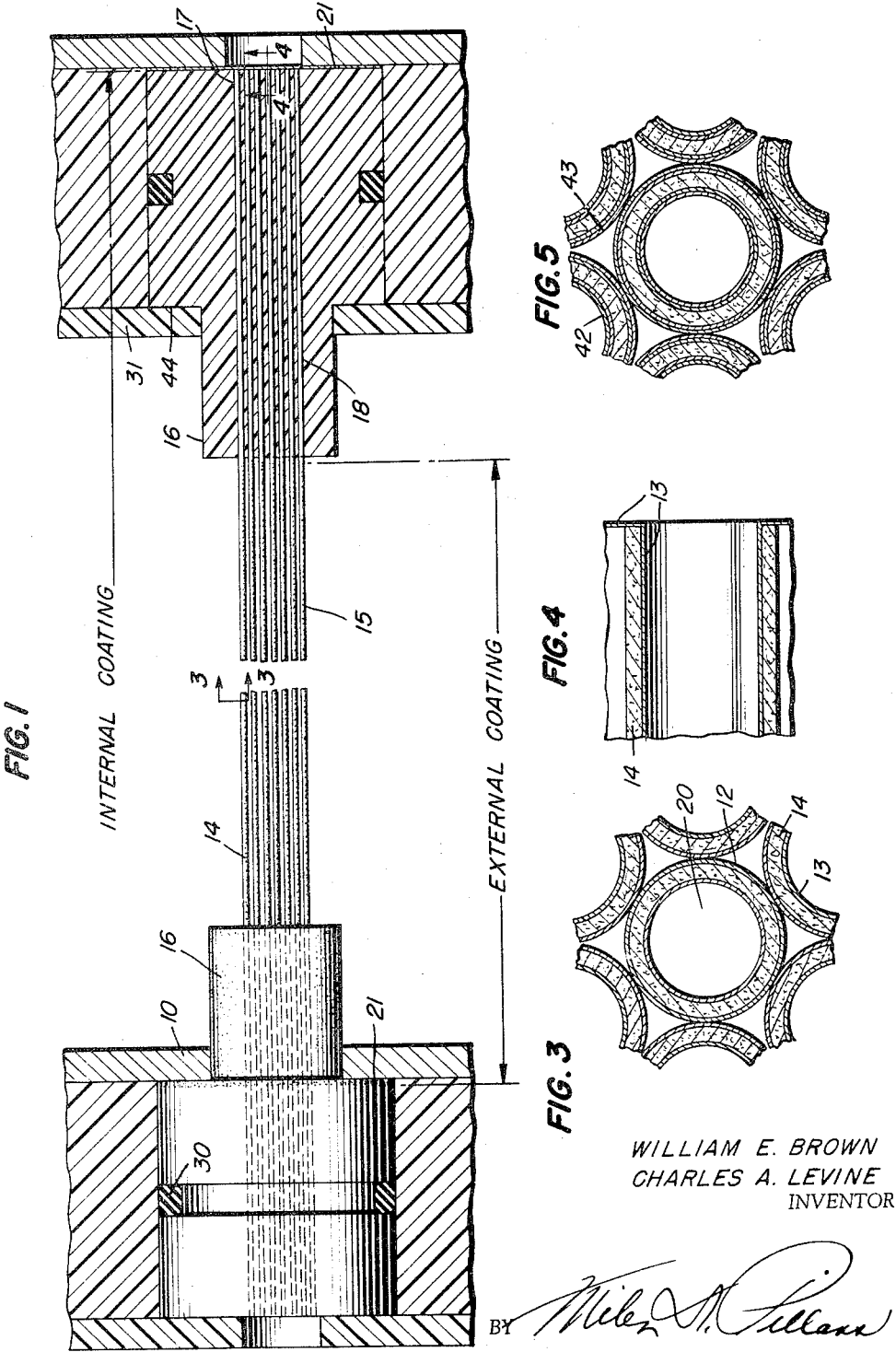
FIGURE 1 is a broken out elevational view, partly in section, of a gaseous fuel cell element of one embodiment of the invention.

Referring now to FIG. 1, there is shown in cross-section a single fuel cell element of the present invention. This cell, designated in its entirety by the numeral 10, consists of a multiplicity of hollow fibers 14, each having ion exchange activity and an outside coating 12 formed thereon together with an inside coating 13 formed thereon. The two coatings consist of the same or different catalytic electrode materials, as set forth in greater detail hereafter.

Each of the individual hollow fiber fuel cell elements 10 have these electrode coatings extending substantially throughout their length on the interior and exterior walls.

A fuel cell according to the present invention is preferably made by assembling a multiplicity of such coated fibers 14 into bundles 15. These bundles preferably consist of at least a hundred of such coated fibers and may, in fact, consist of millions of such fibers.

Preferably, the individual bundles 15 are formed with coupling members 16, 16, one at each end thereof. The bundles of fibers have their exterior terminal portions 17, 17 sealed in fluid tight relation to the interior bores 18, 18 of the coupling members 16, 16. This may be accomplished in any one of a variety of methods wherein a suitable adhesive composition 19, such as an inert epoxy resin, is provided in the interstices between the exteriors of the terminal portions 17, 17 and between these portions and the interior bores 18, 18 of coupling members 16, 16. This adhesive composition may, in fact, be the material from which coupling members 16, 16 are made. It is to be understood that the adhesive does not seal off the end portions of the hollow fibers, so that the interior bores 20 of the hollow fibers are open throughout their length from one terminal portion to the other.

As illustrative of a method of producing such a fluid seal there may be mentioned a process wherein the fibers are initially placed within the bore 18 of the coupling members with their ends projecting beyond the outer end wall 21 of the coupling members. This assembly of the coupling members and of the ends of the fibers is then dipped into a suitable adhesive composition which is allowed to set. The adhesive composition 19 penetrates into the hollow fibers a distance less than the distance which they project beyond the end wall 21. After the adhesive has set, the projecting ends are cut off of the fibers to expose open terminal portions. In other processes, the fibers may have a temporary plugging composition formed in their ends which is capable of easy removal by solution or by the application of heat. This plugging composition is applied prior to the adhesive step and is removed after the adhesive has set. It is also possible to force a gaseous material through the hollow fibers while the adhesive is being applied in order to prevent adhesive from sealing the terminal portions 17.

Figure 2:
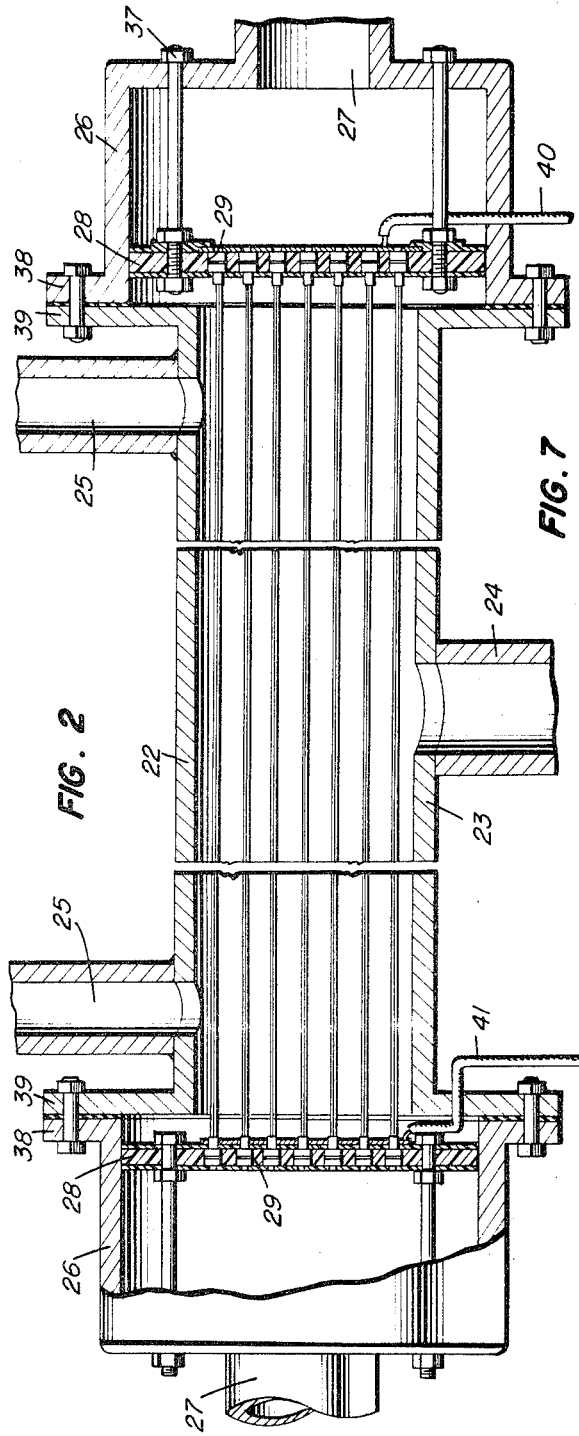
FIGURE 2 is a broken out elevational view, partly in section, of a gaseous fuel cell structure incorporating a plurality of the individual fuel cells.
Figure 7:
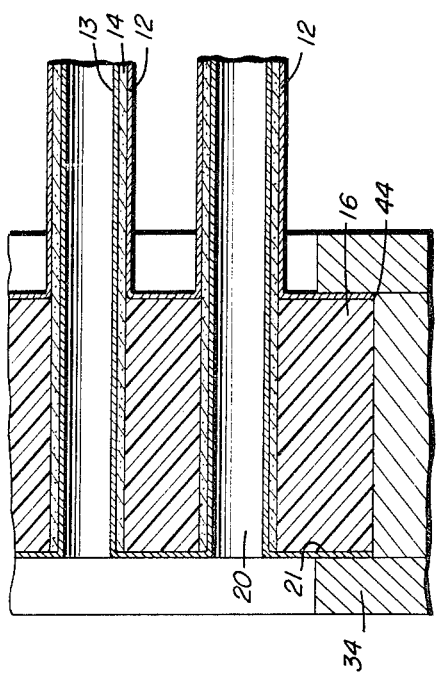
FIGURE 7 is a greatly enlarged cross-sectional view showing an end and edge of the mounting in FIGURE 6.

In FIG. 2 there is shown a typical operative fuel cell structure incorporating a plurality of the bundles formed as described above. This fuel cell is designated in its entirety at numeral 22. The fuel cell includes a casing element 23 having at least one inlet passage 24 for the induction of the fuel or oxidizing gas and an oppositely positioned passage or passages 25 for the removal of spent gas and/or contaminants. Supportably positioned on opposite ends of casing element 23 are header elements 26, 26. Each of these elements has a passage for gases communicating therewith, these passages being designated as 27, 27. It will be understood that the gas may be passed into either of these headers and discharged from the other of these headers, so that the cell is completely reversible.

Separating the headers 26, 26 from the interior of casing 23 are header end plates 28, 28. It will be understood that these header plates have sealing means associated therewith so that the interiors of the header chambers are fluid sealed from the interior of the casing.

Each of the header plates has formed therein a plurality of passages or openings 29, 29, it being understood that the individual passages of both of the header plates are aligned axially. Positioned within each of the passages 29 is the end coupling element 16 of a bundle of hollow fibers formed as described above. Suitable sealing means such as an O-ring 30 may seal the joint between the end plates 28 and the couplings 16, 16.

Figure 6:
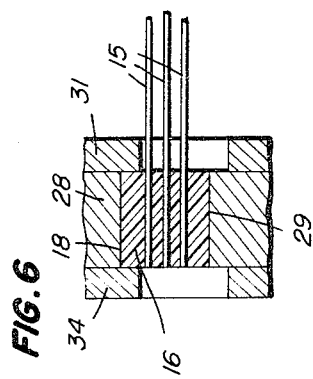
FIGURE 6 is an enlarged cross-sectional view showing a preferred embodiment of the end mounting structure for a bundle of hollow fiber fuel cell elements.

The couplings 16, 16 are inserted in passages 29 and may be locked therein by gate lock plates 31, 34 during the assembly of the permeability cell, which may be positioned on either side of the end plates, as shown in FIGURE 6.

The lock plates 31, 34 may be formed with a cam or other means to longitudinally adjustably position the coupling members in the end plates. The entire end plate may be longitudinally adjustably positioned by any suitable means, such as positioning screws 37 shown in FIG. 2. In this way, if desired, the tension upon the individual fiber bundles may be varied, although it is generally preferable to avoid application of positive drawing force on the fibers in the bundle in order to avoid difficulties from fiber breaks.

This preferred embodiment presents a simple means for supporting and sealably positioning the individual bundles of hollow fibers. Such an arrangement allows each bundle to be removed individually in the event of rupture or of other damage to one of the bundles. Each of the header chambers is preferably formed with external circumferential flanges indicated at 38. These flanges coact in sealed relation, when the overall unit is assembled, with mating flanges 39 positioned on the exterior of casing 23 and are held in sealing relation by any suitable means, such as bolts or the like, in order to provide ready access to the end plates.

The fuel cell structure as thus far described, therefore, consists of a plurality of bundles of fine continuously hollow fibers, supported at their terminal portions only and being substantially unsupported throughout their remaining lengths. The fibers in each bundle are substantially contiguous at their terminal portions and throughout their lengths. Each of the bundles is preferably substantially identical with each of the other bundles as to dimensions of the overall bundle and of the hollow fibers. The interior bores of the header plates and the exterior of the bundles are preferably formed in tubular cross sectional configuration, although such a configuration is, of course, not essential.

It will be understood that each of the individual fibers as assembled in the thus described cell has a suitable coating of electrode catalytic material 13 on the interior surface thereof and a suitable coating of electrode catalytic material 12 on the exterior surface thereof.

The means by which the individual interiors and exteriors of all of the hollow fibers are connected in parallel electrical conductive relation will now be described. It is obvious that individual conductors cannot be led to each of the myriad of individual hollow fiber fuel cell elements as is customary in most of the prior art fuel cells.

Accordingly, in a manner described in detail hereafter, there is formed on the interior of each of the hollow fibers prior to or, preferably, after their assembly in the bundle a coating of electrode catalytic material which extends substantially throughout their active length and also extends out to one or both of the coupling members. By active length is meant the unsupported length of the fibers within the casing between the inner end walls 21 of opposite coupling members. Preferably this conductive electrode material is formed to cover at least one of the entire end walls 21 of the coupling members. In a preferred simple embodiment of the invention, all of the elements of the casing and header and coupling members are formed of nonconductive material, such as a suitable plastic resin, which may be molded or cast into the desired shape and which has high electric resistance. The end locking plate 34 is formed of conductive material and bears against the end surfaces of the coupling members. There is thus formed a continuous electrically conductive path including the interior surface of all of the fibers, the end walls of all of the couplings on one or both of the header plates and the locking plates. From the locking plate to the exterior of the header chamber are provided suitable lead line or lines 40 which connect this half of the cell to the external load.

It will be obvious that, if desired, the cell may be so constructed that insulating means in the form of plates or the like are positioned between the various headers, header plates, locking plates, and casing so that all of these elements may be formed of electrically conductive material. In this event, a separate conducting plate may be utilized to contact the end walls of the coupling members, this separate connecting plate being connected to the external load. It is further obvious that the bundles might be sealed directly within the bores 29 in the header end plates, in which event contact would be made directly with the interior of the ends of the hollow fibers.

In order to insure perfect contact between the external load and the interior of each of the hollow fibers, it is preferable to coat the fiber end walls and the external end portions of the couplings 16 with a continuation of the interior coating, so that this electrode coating material forms a continuous layer throughout the active interior walls of the fibers and across one end wall thereof. This may be done after assembly in the coupling members, where the coupling members are utilized, the electrode coating step being carried out as set forth in detail hereafter.

The exterior surfaces of each of the hollow fibers are coated with an electrode conducting material throughout their active lengths. The coating is discontinued prior to the ends of the hollow fibers. In this manner, there is formed an electrode coating on each of the hollow fibers, these coatings being in electrically conductive relation It will be noted, as discussed above, that the ion exchange membranes are unsupported throughout their active lengths. This construction decreases substantially the liability of rupture of any of the membranes. In prior art devices, it generally has been necessary to utilize a rigid membrane structure or to provide a rigid backing member for the membrane structure. In either case, a large portion of the total volume of the cell is utilized exclusively for providing adequate support for the membranes. Space thus utilized is, of course, wasted from the standpoint of production of electrical energy. Further, the placing of a rigid support in contact with the membrane causes an increased liability of rupture at the individual point of the contact, since at these points augmented pressure is present due to bending of the membrane.

Further, it will be seen that the use of a myriad of individual cells produces a system in which the rupture of a single cell has an almost negligible effect on the efficiency of the overall system. In the heretofore known devices, wherein it was possible to assemble approximately 100 membranes to the cubic foot, the rupture of a single membrane would decrease efficiency by approximately 2% since it disrupts the action in two adjacent cells. Using the system of the present invention wherein, for example, 1,000,000 fibers are assembled in a cubic foot, the rupture of a single fiber causes a decrease in efficiency of one $1/500,000$th percent. Thus the present system provides enhanced qualities for installations which are not attended during operation.

As an illustration of the devices heretofore known in the art, reference may be made to Chemical Week, pages 28 through 30 and 32, July 30, 1960. In this article there are given the output characteristics of a fuel cell constructed of a plurality of the individual cells set forth in Grubb, Jr. 2,913,511. This cell operates at a current density of 2.7 to 27 milliamperes per square centimeter and at such a current density provides an output of 0.82 kilowatt per cubic foot. In contrast, a cell formed in accordance with the present invention and having positioned therein individual hollow fibers having an outside diameter of 100 microns and a wall thickness of 25 microns at the same current density of 2.7 to 27 milliamperes per centimeter gives a power density output of 6 to 60 kilowatts per cubic foot.

Obviously, the practitioner has a choice of using the higher power density output of the cell directly or lowering the current density, taking a somewhat lower power output and thereby relaxing the stringent current density requirements for an economically valuable fuel cell. In certain installations, where desirable, this increased potential energy output will enable the use of cheaper, less efficient electrode materials, due to the very large increase in the total surface area of the cells of the present invention. Thus, it may be desirable to operate the cell at a lower current density, since, as recognized in the art, higher current densities give rise to such problems as polarization effects, due to layer depletion. In the cells heretofore utilized, an attempt to obtain higher current densities results in such polarization, causing the voltage and power output to drop, and in many instances causing the power being supplied at an unsuitably low voltage level. The lower current density allowable by the use of the present invention, therefore, allows a wider choice of catalysts and removes many of the problems caused by polarization, such as a large drop in terminal voltage under heavy load.

The system thus produced operates well at ambient or near ambient pressures and temperatures. As with flat plate ion exchange membrane fuel cells of this type, raising the temperature does increase the power output of the cell with most catalysts. The upper limit on the temperature is controlled by the need to keep liquid water present and by the thermal stability of the ion exchange material. A favorable range is 0–100° C. while the preferred range is 15–85° C. Where desired, the fuel and oxidizer gas pressures can be increased to raise the power density output, although in most instances it will be desirable to operate the cell at, or near, atmospheric pressure. The hollow fibers of the present invention are capable of withstanding pressures of many atmospheres, if this additional pressure is desired or required.

While the invention may be practiced in any manner consistent with the above teachings, there are listed in the table below representative examples of cells constructed in accordance with the present invention; Nalfilm I is a sulfonated polystyrene, Nalfilm II is a quaternary amine polystyrene, and AMF film is a base polymer having quaternary amine ion exchange beads therein, and (c) means finely divided or micronous carbon.

*Experimental data*

| Cell | Voltage, volts | Current, ma./cm.$^2$ |
|---|---|---|
| $H_2$:$Ni^0$/Nalfilm II/$Ni^0$:$O_2$ | 0.655 | No load |
| | .65 | .13 |
| | .62 | .21 |
| | .61 | .31 |
| | .55 | .56 |
| | .50 | .72 |
| | .45 | .90 |
| $C_2H_4$:$Ni^0$/Nalfilm II/$Ni^0$:$O_2$ | .285 | .60 |
| $C_2H_4$:$Ni^0$/AMF film (anion)/$Ni^0$:$O_2$ | .406 | .38 |
| $C_2H_4$:$Ni^0$ (quaternary amine ion exchange hollow tube) $Ni^0$:$O_2$ | .10 | No load |
| $C_2H_4$:$Ni^0$/Nalfilm II/$Ni^0$:$O_2$ | .385 | No load |
| | .29 | 0.140 |
| | .25 | .230 |
| $C_2H_4$:$Ni^0$/Nalfilm II/$Ni^0$:$O_2$ | .33 | No load |
| | .323 | .053 |
| | .246 | .230 |
| $H_2$:$Ag^0$/Nalfilm II/Pt (c):$O_2$ | .5 | No load |
| $C_2H_4$:$Ag^0$/Nalfilm II/Pt (c):$O_2$ | .51 | No load |
| | .11 | .014 |
| $H_2$:Pt (c)/Nalfilm I/Pt (c):$O_2$ | .72 | No load |
| | .68 | .050 |
| $H_2$:$Ag^0$/Nalfilm I/$Ag^0$:$O_2$ | .52 | No load |
| $H_2$:$Pt^0$+$Ag^0$/Nalfilm I/$Ag^0$:$O_2$ | .50 | No load |
| $H_2$:$Pt^0$ (c) (sulfonated polystyrene ion exchange tubing) $Pt^0$ (c):$O_2$. | .385 | No load |
| | .082 | .020 |
| $H_2$:c/Nalfilm I/c:$O_2$ | .15 | No load |
| $CH_2OH$:$Ag^0$/Nalfilm II/$Ag^0$:$O_2$ | .09 | No load |

The foregoing list of applications and examples of the systems of the present invention is not, nor is it intended to be, nor should it be construed as being, all-inclusive. Obviously the teachings of this invention may be successfully applied to other suitable systems, as set forth in the appended claims.

What is claimed is:

1. A gaseous fuel cell comprising a plurality of fine, filamentary, hollow fibers formed of ion exchange resinous material and positioned between and in direct contact with a pair of gas permeable electrodes, said hollow fibers being the sole electrolyte in said cell, means for supplying a fuel gas to one of said electrodes, and means for supplying a gaseous oxidant to the other of said electrodes.

2. A gaseous fuel cell comprising a plurality of fine, filamentary, hollow fibers formed of ion exchange resinous material and each having interior and exterior surfaces, a first electrode coating positioned on each said interior surface, a second electrode coating positioned on each said exterior surface, means for supplying a fuel gas to one of said electrodes, and means for supplying a gaseous oxidant to the other of said electrodes.

3. A gaseous fuel cell comprising a plurality of fine, filamentary, hollow fiber membranes formed of a hydrated ion exchange resinous material and each having interior and exterior surfaces, said membranes being the sole electrolyte in said cell, a first electrode coating positioned on each said interior surface, a second electrode coating positioned on each said exterior surface, means for supplying a fuel gas to one of said electrode coatings, and means for supplying a gaseous oxidant to the other of said coatings.

4. The fuel cell of claim 2 wherein the mobile ion in the ion exchange hollow fiber membranes is the hydrogen ion.

5. The fuel cell of claim 2 wherein the mobile ion in the ion exchange hollow fibers is the hydroxyl ion.

6. The fuel cell of claim 2 wherein the electrode coatings are formed of platinum.

7. The fuel cell of claim 2 wherein there is positioned a catalytically active, electrolytically deposited, layer between the said fiber surfaces and at least one of the said electrode coatings.

8. The fuel cell of claim 2 wherein there is positioned a catalytically active, electrolessly deposited, layer between said fiber surfaces and at least one of the said electrode coatings.

9. A gaseous fuel cell comprising a plurality of hollow fibers formed in a bundle, said fibers being substantially parallel and substantially contiguous throughout their lengths and being formed of ion exchange resinous material and having interior and exterior surfaces, a first electrode coating positioned on each of said interior surfaces, a second electrode coating positioned on each of said exterior surfaces, means connecting all of said first electrode coatings in parallel conductive relation, means connecting all of said exterior coatings in parallel conductive relation, means for supplying a fuel gas to one of said electrode coatings, and means for supplying a gaseous oxidant to the other of said electrode coatings.

10. The fuel cell of claim 1 wherein a first conducting plate is electrically connected to said first electrode coatings and a second conductive plate is electrically connected to said second conductive coatings.

11. The fuel cell of claim 1 having means for supporting each of said fibers at said terminal portions only.

12. The fuel cell of claim 1 wherein all of said fibers have all of their dimensional parameters substantially uniform with each other.

13. The fuel cell of claim 1 having means for supporting each of said fibers within said cell at the terminal portions of said fibers only and having means positioned on said supporting means for fluid sealing said interior surfaces from said exterior surfaces.

14. A gaseous fuel cell apparatus including a casing, header chambers supported on said casing and positioned at the opposite ends thereof, at least one bundle of hollow fibers formed of ion exchange resinous material and having interior and exterior surfaces and opposite terminal portions, separate header plates separating each of said headers from said casing in fluid sealing relation, means for supporting the opposite terminal portions of said fibers on said header plates with their interior surfaces in fluid communication with said header chambers, a first electrode coating positioned on each of said interior surfaces, a second electrode coating positioned on each of said exterior surfaces, means for supplying a fuel gas to one of said electrodes, and means for supplying a gaseous oxidant to the other of said electrodes.

15. The fuel cell apparatus of claim 9 wherein the means for supplying fuel gas comprises a passage leading into the interior of one of said headers.

16. The fuel cell apparatus of claim 9 wherein the means for supplying the gaseous oxidant comprises a passage leading into the interior of said casing.

17. The fuel cell apparatus of claim 9 wherein the means for supplying said fuel gas comprises an entrance passage to one of said headers and an exit passage for spent fuel gas from the other of said headers, and the means for supplying said gaseous oxidant comprises an entrance passage into said casing and an exit passage for spent gas positioned on the opposite side of said casing.

18. The fuel cell apparatus of claim 9 wherein said first end plate has positioned adjacent thereto a conductive means in conductive relation with said first electrode coatings and said second header plate has positioned adjacent thereto a second conductive means conductively connected to said second electrode coatings.

19. A gaseous fuel cell comprising a casing having opposite end portions, header chambers supported on said casing and positioned at opposite ends thereof, a first header plate separating said first header chamber from said casing, a second header plate separating said second header chamber from said casing, said first header plate having a plurality of passages extending therethrough, said second header plate having a plurality of aligned passages extending therethrough, a plurality of bundles of hollow fibers formed of hydrated ion exchange resinous material and having interior and exterior surfaces and terminal portions at each end thereof and a uniform bore extending therethrough, separate coupling means surrounding all of each of the terminal portions of said bundles of hollow fibers, means for positioning said coupling members in said aligned passages whereby said hollow fibers are supported at their terminal portions with the interior surfaces and bores thereof in communication with each of said header chambers, a first electrode coating positioned on each of said interior surfaces and extending throughout said bores at least over the length thereof positioned between said header plates, a second electrode coating positioned on all of said exterior surfaces and extending substantially throughout the length of said surfaces positioned between said header plates, for supplying a fuel gas to one of said headers and means for supplying a gaseous oxidant to said casing.

20. The fuel cell apparatus of claim 14 wherein a first conductive means is positioned adjacent said first header plate in conductive relation with said interior electrode coatings and a second conductive means is positioned adjacent said second header plate in conductive relation with said exterior electrode coatings.

21. The fuel cell apparatus of claim 14 wherein a first conductive means is positioned adjacent said first header plate in conductive relation with said interior electrode coatings and a second conductive means is positioned adjacent said second header plate in conductive relation with said exterior electrode coatings, and wherein said first conductive means includes a continuation of said electrode coating from said interior surfaces onto the outer end wall of said coupling member.

22. The fuel cell apparatus of claim 14 wherein a first conductive means is positioned adjacent said first header plate in conductive relation with said interior electrode coatings and a second conductive means is positioned adjacent said second header plate in conductive relation with said exterior electrode coatings, and wherein said second conductive means includes a continuation of said exterior electrode coating onto the inner end wall of said coupling members.

23. A process of converting chemical energy to electrical energy by means of a gaseous fuel cell comprising the steps of dividing a fuel gas into a large multiplicity of individual streams solely by passing said fuel gas into contact with an identical large multiplicity of individual ion exchange hydrated membranes having at least two dimensional parameters thereof less than 1000 microns, each of said membranes having electrode coatings on the opposite sides thereof, and simultaneously dividing a gaseous oxidant into an identical large multiplicity of individual streams solely by simultaneously passing said gaseous oxidant into contact with said membranes.

24. The process of claim 23 wherein said large multiplicity consists of at least $10^3$.

25. The process of claim 23 wherein said multiplicity consists of at least $10^6$.

26. The process of claim 23 wherein water formed by the fuel cell is removed solely by one of said large multiplicity of individual gaseous streams.

27. A process of converting chemical energy into electrical energy by means of a gaseous fuel cell comprising the steps of providing a multiplicity of individual hollow fibers, passing a fuel gas into contact with electrode coatings on the interior surfaces of said hollow fibers and simultaneously passing a gaseous oxidant into contact with an electrode coating on the exterior surfaces of said fibers.

when the fibers are assembled in a bundle. It will be appreciated that such a coating may be formed on the fibers prior to their assembly in the bundle or before or after their assembly with the coupling members. This exterior catalytic electrode coating may be continued from the exteriors of the bundles across the interior end walls 44 of the couplings 16 opposite from the coupling end walls 21 to which the interior electrodes are connected. Where the elements are formed from electrically insulating material, the interior locking plate 31 may be formed of electrically conducting material which contacts the interior end walls of the coupling, and there is connected to the conducting plate an external lead or leads 41 similar to leads 40 which are connected to the load. There is thus formed a continuous electrical half cell consisting of the coatings on the exteriors of each of the fibers, the coating on the couplings and the conducting locking plate and external lead.

It will be understood that various removable resins or stopping agents may be utilized in the preparation of the above-described electrode coatings in order to control the positioning of the coating. These materials may be removable or may be nonadherent to the coating, in any suitable fashion known to the art.

In the operation of the cell thus described, a fuel gas is fed through the cell in one direction and a suitable oxidizing gas is fed through the cell in the opposite direction. In a typical example, hydrogen fuel gas may be fed into one of the header chambers 26 from passage 27 and distributed therefrom into the interiors of each of the hollow fibers, the spent fuel gas being removed, after having passed through the hollow fibers 14 from the opposite header chamber through opposite passage 27. The oxidizing gas enters the casing 23 through passage 24 and exits at the opposite passages 25, 25 after having passed over the exterior of all of the hollow fibers positioned within the casing. It will be appreciated that both the fuel gas and the oxidant gas are thus divided into a like large multiplicity of individual gas streams, this division being accomplished solely by the like large multiplicity of individual fibers. The system, therefore, dispenses with manifold structures generally utilized in fuel cells. This multiplicity is of the order of at least $10^2$ and is preferably of the order of $10^6$ or greater.

Since most of the reactions contemplated for gaseous fuel cells result in the formation of water, the prior art fuel cells have of necessity had to have incorporated therewith a mechanism, frequently elaborate, for draining any formed water from the cell in order to insure efficient operation. It will be readily apparent that the cell of the present invention obviates the necessity for any additional mechanism for removing the water. The water formed in the reaction in the process of the present invention appears in the form of minute individual droplets which are continuously purged from the surface either of the interior or the exterior of the fibers by the gas traveling therethrough. Where a reversible overall process is desired, additional means, not shown, may be provided for removing the water vapor from the spent gaseous streams. It will be appreciated that the formation of the water on the myriad surfaces presented by the cell of the present invention causes the water to be formed in such minute particles that this purging process is practical, where it has been heretofore impractical.

The gaseous fuel cells of the present invention are intended to operate in any suitable process utilizing known fuel gases and oxidants. Suitable fuel gases may be generally characterized as all gaseous compounds which oxidize giving a reaction with a negative free energy change ($\Delta F$). Among the fuel gases suitable for use according to the present invention are hydrogen, ethylene, propylene, butene, methane, carbon monoxide, methanol, ethanol, etc. While the preferred oxidant is oxygen, other suitable oxidizing gases, such as air or the like, may be utilized.

In a typical reaction wherein the membrane hollow fiber 14 is a cation permeable membrane, having H ions as the resultant mobile ion, using hydrogen as a fuel gas and oxygen as the oxidizing gas, the overall cell reaction is the oxidation of hydrogen to water. The respective resultant reactions at the anode and cathode are as follows:

$$H_2 \rightarrow 2H^+ + 2e$$

$$1/2 O_2 + 2_H{^+} + 2e \rightarrow H_2O$$

If the fuel cell of the present invention has the hydrogen fed into the interior of the hollow fibers and the oxygen fed around the exteriors thereof, then the interior surface electrode 13 will be the anode and the exterior surface electrode 12 will be the cathode.

While the above equations may be used to summarize the respective reactions at the anode and cathode, it is believed that the H+ is actually passed through the membrane in the form of $H_3^+O$ to react with the oxygen at the anode, forming water. It will be seen that the formation of $H_3^+O$ from H+ is by the equation $$H^+ + H_2O \rightarrow H_3^+O$$

This reaction tends to deplete the cathode side of the membrane of water.

The various ion exchange resins which are utilizable in gaseous ion exchange fuel cells all have a common characteristic of having retained therein water in percentages generally varying between 15 and 50%, so that the resinous material is hydrated. This water cannot be removed from the resin by mechanical force, since it is retained therein by secondary Van Der Waals forces. In order for the exchange ions to be transported across the membrane from one electrode to another, it is essential that this water be present throughout the membrane structure. By reference to the above equation it can be seen that the oxidation process of the cell can cause a depletion of water from the cathode side of the membrane. If water molecules are removed from the cathode side of the membrane faster than they can diffuse back, then this cathode side will be partially dried out, resulting in a considerably lessened current density available from the cell. The various prior art devices, relying upon thick membranes, have been subject to this process of cathode membrane drying, since their thickness is so great that the removed water molecules cannot be adequately replaced by rediffusion of the newly formed water molecules back to the cathode side of the membrane. With the structure of the present invention, the membrane walls are sufficiently thin so that this back diffusion of water is not impaired and proceeds at a rate sufficiently great to prevent cathode dehydration.

Assuming the fuel cell set up for gas feed as outlined above, and assuming an anion permeable membrane with hydrogen and oxygen as the fuel and oxidant gases, the overall reaction of the cell is again the oxidation of hydrogen to water with the electrode reactions at the respective anode and cathode being as follows:

$$H_2 + 2OH^- \rightarrow 2H_2O + 2e$$

$$1/2 O_2 + H_2O + 2e \rightarrow 2OH^-$$

It will be understood that similar reactions occur with various other fuel gases dependent upon which ion is transported by the ion exchange membrane.

Ion exchange resin membranes suitable for formation into hollow fibers utilizable in the gaseous fuel cells of the present invention generally fall within three classes. The first of these classes is a hollow fiber consisting entirely of ion exchange resin. The second of these classes consists of a hollow fiber formed from a base resin having incorporated therein an ion exchange resin. The third class consists of a hollow fiber formed from a base resin reacted with ion exchange forming materials.

Any of the ion exchange resins known to the art may be utilized in the fuel cells of the present invention.

As is well known, such resins contain a mobile ionic substituent. In the case of cation exchange resins, these ion groups are generally acidic groups such as a sulfonic acid group, a carboxyl group, and the like. The ionizable substituent is attached to a polymeric material such as phenol-aldehyde resins, polystyrene-divinyl benzene, polystyrene, styrene-grafted polyethylene, or the like. This cation component is a mobile and replaceable ion electrostatically associated with the fused component of the resin molecule. It is the ability of the cation to be replaced under appropriate conditions by other cations which imparts the ion exchange characteristics to these materials. For suitable cationic exchange materials, reference is made to Juda et al. Reissue 24,865, Johnson 2,658,042, Ferris 2,678,306, and Bodamer 2,681,320. As preferred cationic exchange resins may be mentioned: (1) sulphonated polystyrene formed by sulfonating polystyrene or by forming an admixture of sulfonated polystyrene and other polymers, and (2) polyethylene having styrene grafted thereto by chemical and radiation means followed by reaction with chlorosulfonic acid.

Anion exchange resin hollow fibers may be formed of any of the suitable materials known to the art and are similar in their action to the cation exchange resins except that in the anion exchange resins it is the ability of the anion to be replaced which causes the ion exchange activity. Generally speaking, such anion resins are formed by incorporating an amine group in the resin. Particularly suitable are quaternary amines. Preferred anion membranes suitable for use in the present invention are the following:

(1) polystyrene chloromethylated and reacted with a tertiary amine;
(2) polyethylene having incorporated therein quaternary amine ion exchange beads, such as Dowex 1;
(3) polyethylene tubing having styrene grafted thereto by chemical and radiation means and reacted with chloromethyl ether, this reaction product being further reacted with triethyl amine.

For other suitable anion exchange resins reference is made to the above-mentioned Juda patent, Kropa 2,663,702 and Bodamer 2,681,319.

The various resinous materials discussed above may be formed into hollow fibers suitable for use in the present invention by any suitable process and apparatus known to the art, such as that shown in British Patent 514,638. Depending upon the fiber-forming material employed, there may be used melt, dry and wet spinning procedures using spinerettes of any design apt for the purpose or by any other techniques, such as will occur to those who are skilled in the art. Such a process may include the incorporation of a soluble core material in the fiber, which, if used, is dissolved out of the fiber to produce the hollow uniform interior bore. Fibers so formed will have a continuous uniform bore as well as uniform outer and inner diameters. It is usually expedient to take up the hollow fibers on a reel or other suitable means for collection prior to their assembly in the cells utilized in the process of the invention; i.e., the fibers are formed as continuous filaments which are stored and otherwise treated prior to their formation into the desired length fibers utilized in the gaseous fuel cells.

The contemplated fibers, in order to best take advantage of their large surface area, are formed in as small dimensions as is permissible, which dimensions will still support an inner electrode coating and at the same time provide an unobstructed uniform bore for the passage of gas interiorly of the fibers. Generally speaking, such fibers should not have an outside diameter in excess of 1000 microns. The preferred range of outside diameter of these fibers is between 10 and 100 microns. The inner diameter should be so selected in the preferred fibers as to hold within the limits of between about ⅓ and ⅛ of the outside diameter the thickness of the uniform walls of the fibers. This would correspond to a wall thickness range of between about 2 to about 33 microns. It will be understood that the thickness of the electrode coatings on the interior and exterior walls of the fibers will generally be less than the thickness of the walls of the fibers, athough this is not necessarily the case. In a preferred embodiment, these coatings are held to approximately 1/10 to ½ the thickness of the walls of the fibers.

Generally speaking, any suitable catalytic material may be used for the catalytic electrode coatings. As suitable materials may be mentioned the following: finely divided micronous carbon particles deposited from an aqueous suspension such as Aquadag, metallic silver deposited by reduction in place of silver nitrate, platinum black deposited from chloroplatinic acid, finely divided metallic nickel deposited from an aqueous suspension, mixtures of carbon particles and platinum black, mixtures of carbon particles and nickel, and metallic nickel electrodes deposited on a carbon particle surface. Other suitable electrode materials such as rhodium, palladium, iridium, copper, suitable catalyst bases activated with metals and oxides or the like, may be utilized. It will be understood that such coatings may be applied to the hollow fiber by suspension deposition, vapor spraying, electrolytic plating and electroless plating and the like, so long as a sufficiently fine layer may be formed, which layer on the interior of the fiber will not unduly constrict the bore thereof to the free passage of gases.

In certain instances the deposited electrode catalytic coatings will not be sufficiently electrically conductive to produce an efficient fuel cell. In these cases, the hollow fibers are formed as is shown in FIGURE 5, by providing an additional conductive layer 42 or layers 42, 43 on one or both sides of the hollow fibers. Thus, where finely deposited nickel is used on the interior of the fibers as a catalyst, it may be desired to place a layer of silver adjacent to the nickel layer in order to provide a better conductive path. This may be accomplished, for example, by first laying down a silver coating on the inside of the fiber, as, for example, by Brashear silvering, and then electroplating a nickel ion solution from the exterior inward in a fiber which has already been coated on the interior with silver. If a nickel ion solution is thus utilized, it will be found that the nickel ions diffuse through the thin membrane walls of the hollow fibers and are deposited in the solid boundary of the hollow fibers at the interior surface thereof, between the fiber surface and the silver layer. If the exterior of the fiber is now covered with an electrically conductive coating, reversing the direction of electroplating will now replate some of the nickel into the boundary between the exterior of the hollow fiber and the exterior electrical conductive layer. Conductive coatings may be placed on the exterior of the hollow fibers, which have been catalyst coated, by spraying or by other forms of coating. As a third embodiment, if a finely divided catalyst such as platinum is desired, the conductive coating can be first applied as above and then solutions containing chloroplatinic acid diffused through the membrane so that the metal (e.g. platinum) deposits out in the boundary by electroless plating. In any event, it will be understood that the deposited catalytic electrode coatings are substantially continuous on both the interior and exterior of the hollow fibers throughout their active lengths; i.e., the lengths which are exposed on both the inside and the outside to the reactive gases.

Reference is made again to the extremely small dimensions of the fuel cells utilized in the present invention. Such construction provides a fuel cell surface area many multiples or times greater than has hitherto been achieved per unit volume. The extreme thinness of the membranes also reduces the electrical resistivity of the individual cells and insures adequate rediffusion of the water within the membrane.

28. The fuel cell of claim 1 wherein said hollow fibers have an outside diameter of not more than 1000 microns.

29. The fuel cell of claim 1 wherein said hollow fibers have an outside diameter of between 10 and 100 microns and a wall thickness of between 2 and 33 microns.

30. The fuel cell of claim 1 wherein said hollow fibers have an outside diameter of not more than 1000 microns and the ratio of the thickness of said hollow fibers to said outside diameter is between one-third and one-eighth.

31. The method of operating the fuel cell of claim 1 wherein the fuel gas is selected from the group consisting of hydrogen, ethylene and methanol.

32. The method of operating the fuel cell of claim 1 wherein the gaseous oxidant is selected from the group consisting of oxygen and air.

References Cited by the Examiner

UNITED STATES PATENTS 2,913,511  11/1959  Grubb _____ 136—86

OTHER REFERENCES

Electronic Design, Oct. 1, 1957, page 5.

WINSTON A. DOUGLAS, *Primary Examiner.*

JOHN R. SPECK, JOHN H. MACK, *Examiners.*